United States Patent
Guidotti et al.

(10) Patent No.: US 10,438,479 B1
(45) Date of Patent: Oct. 8, 2019

(54) SAFETY ENHANCEMENT FOR PERSONS UNDER THE CARE OF OTHERS

(71) Applicant: International Business Machines Corporation, Armonk, NY (US)

(72) Inventors: Alice Guidotti, Rome (IT); Marco Vettori, Rome (IT); Carola Girolami, Rome (IT); Luigi G. Abate, Cosenza (IT); Cristina D'Angelo, Rome (IT); Annalisa Chiacchiaretta, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/984,807

(22) Filed: May 21, 2018

(51) Int. Cl.
  *G08B 21/04* (2006.01)
  *G08B 31/00* (2006.01)
  *B60Q 1/50* (2006.01)
  *G08B 21/02* (2006.01)
  *G08B 21/22* (2006.01)

(52) U.S. Cl.
  CPC ............. *G08B 31/00* (2013.01); *B60Q 1/50* (2013.01); *G08B 21/0205* (2013.01); *G08B 21/22* (2013.01)

(58) Field of Classification Search
  CPC .... G08B 21/0202; G08B 21/02; G08B 21/22; G08B 21/0225; G08B 21/0227; G08B 21/0213; B60N 2/002
  See application file for complete search history.

(56) References Cited

U.S. PATENT DOCUMENTS

| 8,232,874 B1 | 7/2012 | Aneiros et al. |
| 9,469,176 B2 | 10/2016 | Boyer et al. |
| 9,796,371 B2 | 10/2017 | Soifer |
| 2011/0121956 A1 | 5/2011 | Rodriguez |

(Continued)

FOREIGN PATENT DOCUMENTS

CN 107481476 A 12/2017

OTHER PUBLICATIONS

Mahdin et al, "Minimizing Heatstroke Incidents for Young Children Left Inside Vehicle", International Engineering Research and Innovation Symposium (IRIS 2016), IOP Conference Series: Materials Science and Engineering, vol. 160, Melaka, Malaysia, Nov. 24-25, 2016.

(Continued)

*Primary Examiner* — Hongmin Fan
(74) *Attorney, Agent, or Firm* — Edward J. Wixted, III (57) ABSTRACT

A system enhances safety of a dependent person, if a caregiver inadvertently leaves the person unattended in a parked vehicle, by sending an escalating alarm sequence to the caregiver and/or other responsive parties. The system learns, via monitoring, a series of patterns associated with movements of a set of related mobile devices. The system continues to monitor, on an ongoing basis, the devices, and continually compares the current status of each one with its expected status based on the learned patterns. If the system detects a deviation between the current and expected status with respect to one or more of the devices, it computes an alarm level and a false positive score. If the combination of the alarm level and the false positive score is above a threshold value, the system initiates the alarm sequence. Note: a child should never be left unattended in a parked vehicle.

18 Claims, 4 Drawing Sheets

(56) References Cited

U.S. PATENT DOCUMENTS

2014/0253314 A1\* 9/2014 Rambadt ............... B60N 2/002
 340/457.1
2016/0071390 A1\* 3/2016 Sales .................... A61B 5/1114
 340/573.1

OTHER PUBLICATIONS

Soto et al., "Agents That Help to Avoid Hyperthermia in Young Children Left in a Baby Seat Inside an Enclosed Car", Mexican International Conference on Artificial Intelligence (MICAI 2014): Nature-Inspired Computation and Machine Learning, Lecture Notes in Computer Science, vol. 8857, pp. 510-517.
Weingarten, Gene, "Fatal Distraction: Forgetting a Child in the Backseat of a Car is a Horrifying Mistake. Is It a Crime?", Printed Mar. 8, 2018, 22 pages. <http://www.kidsandcars.org/2016/07/08/fatal-distraction-forgetting-a-child-in-the-backseat-of-a-car-is-a-horrifying-mistake-is-it-a-crime/>.
"Heatstroke Deaths of Children in Vehicles", Updated Apr. 4, 2018, <http://noheatstroke.org/>.
"Evenflo, Award-Winning SensorSafe Technology", 9 pages, <http://www.evenflo.com/sensorsafe/sensorsafe.html>. © 2018.
"Remmy, The First 'Baby Monitor' Giving Voice to Your Child in Car", 3 pages, <http://www.remmy.it/en/?jjj=1523281848284>, © 2018, Bologna, Italy.
Ting, "How a Regular Guy Invented a Life-Saving Car Option", Smart Design, Oct. 18, 2016, 3 pages. <http://www.designhub.it/smartdesign/2016/10/18/regular-guy-invented-life-saving-car-option/>.
"How a Regular Guy is Changing Europe's Car Industry" Opel Gabriel—LDV United, 7 pages, <http://www.ldv.be/opelgabriel/>.
"Opel Gabriel—News",Jan. 10, 2014, 4 pages, <https://www.zenso.be/news/11/opel-gabriel/>.
"One Simple App Can Save Your Child's Life", Kars 4 Kids Safety App—Never Forget Your Kid in the Car, 8 pages, <http://www.kars4kids.org/safety-app/>, © Kars4Kids 2014.
"Infant Reminder: No more forgotten children in vehicles", 2 pages. <http://www.infantreminder.com/>. © 2013 IT Security di Ferrito Guiseppe.
"Don't forget Timmy or Fido in the car with new Child Reminder safety feature", Waze—Official Blog, 3 pages, <https://blog.waze.com/2016/08/dont-forget-timmy-or-fido-in-car-with.html>, © 2006-2013 Waze.

\* cited by examiner

| | MONDAY | TUESDAY | WEDNESDAY | THURSDAY | FRIDAY |
|---|---|---|---|---|---|
| | FATHER CAN TAKE DEPENDENT TO DAYCARE AT 9:00. 405A | FATHER CAN TAKE DEPENDENT TO DAYCARE AT 9:00 | FATHER CAN TAKE DEPENDENT TO DAYCARE AT 8:30 | MOTHER CAN TAKE DEPENDENT TO DAYCARE AT 8:30 | MOTHER CAN TAKE DEPENDENT TO DAYCARE AT 8:30 |
| | MOTHER CAN TAKE DEPENDENT TO DAYCARE AT 8:30. 405B | IF DEPENDENT IS NOT GOING TO DAYCARE, NANNY MIGHT COME AT HOME BEFORE 10:00 | IF FATHER IS ABROAD, GRANDFATHER MIGHT COME TO THE HOUSE AND TAKE DEPENDENT TO THE DAYCARE AT 9:30 | IF MOTHER IS ABROAD, GRANDFATHER MIGHT COME TO THE HOUSE AND TAKE DEPENDENT TO THE DAYCARE AT 9:30 | IF MOTHER IS ABROAD, GRANDFATHER MIGHT COME TO THE HOUSE AND TAKE DEPENDENT TO THE DAYCARE AT 9:30 |
| | IF DEPENDENT IS NOT GOING TO DAYCARE, NANNY MIGHT ARRIVE AT DEPENDENT'S HOME BEFORE 8:30. 405C | IF DEPENDENT IS NOT GOING TO DAYCARE, GRANDMOTHER MIGHT COME AT HOME BEFORE 9:00 | IF DEPENDENT IS NOT GOING TO DAYCARE. MOTHER MIGHT TAKE DEPENDENT AT GRANDMOTHER'S HOUSE BEFORE 9:00, WHERE DEPENDENT IS STAYING WITH GRANDMOTHER | IF DEPENDENT IS NOT GOING TO DAYCARE, MOTHER STAYS AT HOME. | IF DEPENDENT IS NOT GOING TO DAYCARE, FATHER GOES DIRECTLY TO OFFICE |
| | IF DEPENDENT IS NOT GOING TO DAYCARE, FATHER GOES DIRECTLY TO OFFICE. 405D | IF DEPENDENT IS NOT GOING TO DAYCARE, FATHER GOES DIRECTLY TO OFFICE | IF DEPENDENT IS NOT GOING TO DAYCARE, FATHER GOES DIRECTLY TO OFFICE | IF DEPENDENT IS NOT GOING TO DAYCARE, FATHER GOES DIRECTLY TO OFFICE | |

SAFETY ENHANCEMENT FOR PERSONS UNDER THE CARE OF OTHERS

BACKGROUND

The present invention relates generally to the field of safety, and more particularly to enhancing the safety of persons in a vehicle and dependent on a caregiver.

In modern life, people hurry about, travelling by car to or from work, shops, daycare facilities, etc. There have been instances where a parent, through inattention or distraction, forgets that they have a child with them in a vehicle. The parent exits the vehicle and absentmindedly leaves the child unattended inside the parked vehicle. The temperature inside the vehicle may subsequently rise or fall to unsafe levels.

SUMMARY

According to an aspect of the present invention, there is a method, computer program product and/or system that performs the following operations (not necessarily in the following order): (i) receiving information that identifies a plurality of communication devices including a first communication device, a second communication device and a third communication device; (ii) receiving a history profile, including information indicative of a plurality of relationships, over time, including relationships between the first communication device and the second communication device; (iii) predicting, based at least in part on the history profile, an expected relationship status between the first communication device and the second communication device during a specified time window; (iv) receiving, during the specified time window, information indicative of a current relationship status between the first communication device and the second communication device; (v) determining that the current relationship status is not in accordance with the expected relationship status during the specified time window; and (vi) in response to determining that current relationship status is not in accordance with the expected relationship status during the specified time window, initiating a first alarm sequence.

DETAILED DESCRIPTION

Embodiments of the present invention enhance the safety of a person or pet (hereinafter referred to as a dependent) under the responsibility of a caregiver, by helping caregivers to avoid inadvertently leaving a dependent unattended: (i) in an automobile; (ii) at a highway rest stop; (iii) at home, inside or outside; (iv) in a parking lot; or (v) any place where it would be considered unsafe to leave the dependent unattended. An embodiment system monitors movements of various mobile devices being carried by caregivers and/or dependents, to learn (detect, or recognize) patterns of movement. The system develops rules aimed at identifying, with respect to those mobile devices, future deviations or departures from those patterns. The system monitors, in real-time (or near real-time), ongoing movements (current status) of the various mobile devices. The system evaluates the rules in view of the current status of each mobile device, to detect deviations from the learned patterns. In some embodiments, each rule includes specified responses, such as issuing alerts (sometimes herein referred to as alarms) to designated recipients in response to certain deviations from the patterns. The alerts are designed to attract the attention of caregivers and help them to recognize and respond should someone happen to inadvertently leave a dependent unattended in an automobile (or anywhere else considered unsafe). Safety, particularly with respect to a child being left unattended in an automobile, is a focus, but not the only focus, of this invention. It is to be understood that many embodiments may be applied not only to children, but to a broader class of dependents (including other people and animals, such a medical patients, non-ambulatory persons, and pets to name a few examples). It is to be further understood that many embodiments may be applied to a broad array of situations (such as persons regularly working in hazardous or confined spaces in occupational (for example, industrial and/or agricultural) environments, dependents left stranded when a caregiver inadvertently drives off without them, etc.), while keeping within the scope and spirit of the present invention. (Note, dependents such as children, pets, infirm and/or non-ambulatory persons in a vehicle should always be accompanied by a responsible caregiver.)

Some embodiments of the present invention comprise three phases: Learning, detecting, and alarming. In the learning phase, the system collects data to learn recurring patterns of movement, among a set of related mobile devices (related by belonging to a family unit, including persons involved in the care and wellbeing of a dependent individual, for example). The patterns not only describe movements of individual devices over time, but also describe temporal and spatial interrelationships between and among them as well. The detecting phase performs ongoing monitoring of the mobile devices and compares their movements and interrelationships against the learned patterns, to detect a real-time departure (deviation) from the learned patterns. If the system detects a deviation, it assesses: (i) a hazard potential associated with the deviation; and (ii) the risk of a false positive. Depending on the combination of hazard potential and false positive risk, the alarming phase may initiate an alarming sequence designed to alert individuals who can respond and address the cause of the alarm. Detailed discussion of the learning, detecting and alarming phases is presented below, in the section Further Comments and/or Embodiments.

A pattern, as used herein, refers to any combination of properties with respect to a number of mobile communication devices (such as the combination of geographic location and velocity at a corresponding moment of time, to name one example) that repeats with a certain level of predictability, such as repeating at the same time each day, each workday, each week, each month, etc. A pattern may include times and durations of when the mobile device is in motion, or is stationary. A pattern may have first order, or second order (or higher orders) properties, such as a weekly pattern that is altered once per month. Such a pattern could be considered to represent a monthly pattern (a first order property) overlaid on a weekly pattern (a second order property). Moreover, a property with respect to a mobile communication device may be represented by a two-element vector that comprises, for example, a location of the mobile device at a corresponding time, or a four-element vector comprising: (i) location; (ii) rate of travel; (iii) direction of travel, and (iv) time. (Note: one skilled in the relevant art will recognize the combination of items (ii) and (iii) above (rate and direction of travel) as defining a velocity of the mobile device.) In some embodiments, the vector has many elements with respect to status of a mobile device, such as: location; velocity; time of day; day of week; day of month; and any number of additional characteristics.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
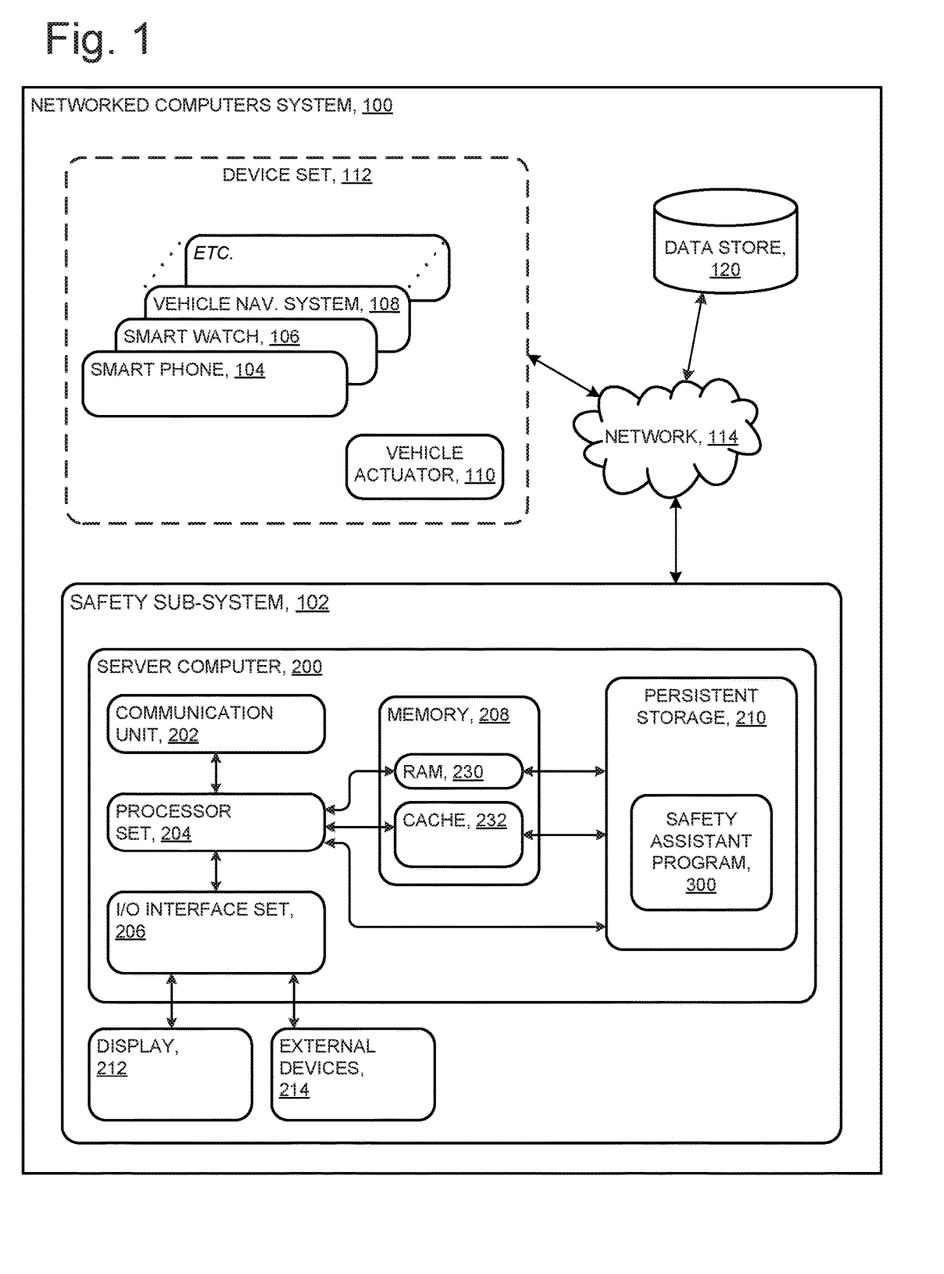
FIG. 1 is a block diagram of a first embodiment system according to the present invention.

An embodiment of a possible hardware and software environment for software and/or methods according to the present invention will now be described in detail with reference to the Figures. FIG. 1 is a functional block diagram illustrating various portions of networked computers system 100, including: safety sub-system 102; smart phone 104; smart watch 106; vehicle navigation system 108; vehicle actuator 110; device set 112; communication network 114; data store 120; server computer 200; communication unit 202; processor set 204; input/output (I/O) interface set 206; memory device 208; persistent storage device 210; display device 212; external device set 214; random access memory (RAM) devices 230; cache memory device 232; and safety assistant program 300.

Safety sub-system 102 is, in many respects, representative of the various computer sub-system(s) in the present invention. Accordingly, several portions of safety sub-system 102 will now be discussed in the following paragraphs.

Safety sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Safety assistant program 300 is a collection of machine readable instructions and/or data that is used to create, manage and control certain software functions that will be discussed in detail, below, in the Example Embodiment sub-section of this Detailed Description section.

Safety sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Safety sub-system 102 is shown as a block diagram with many double arrows. These double arrows (no separate reference numerals) represent a communications fabric, which provides communications between various components of safety sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for safety sub-system 102; and/or (ii) devices external to safety sub-system 102 may be able to provide memory for safety sub-system 102.

Safety assistant program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Safety assistant program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to safety sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, safety assistant program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
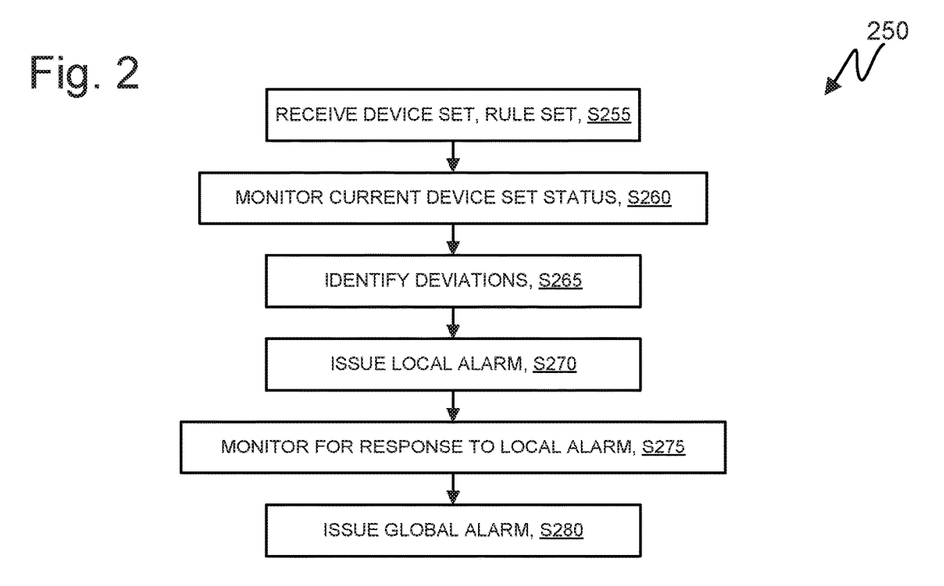
FIG. 2 is a flowchart showing a first embodiment method performed, at least in part, by the first embodiment system.
Figure 3:
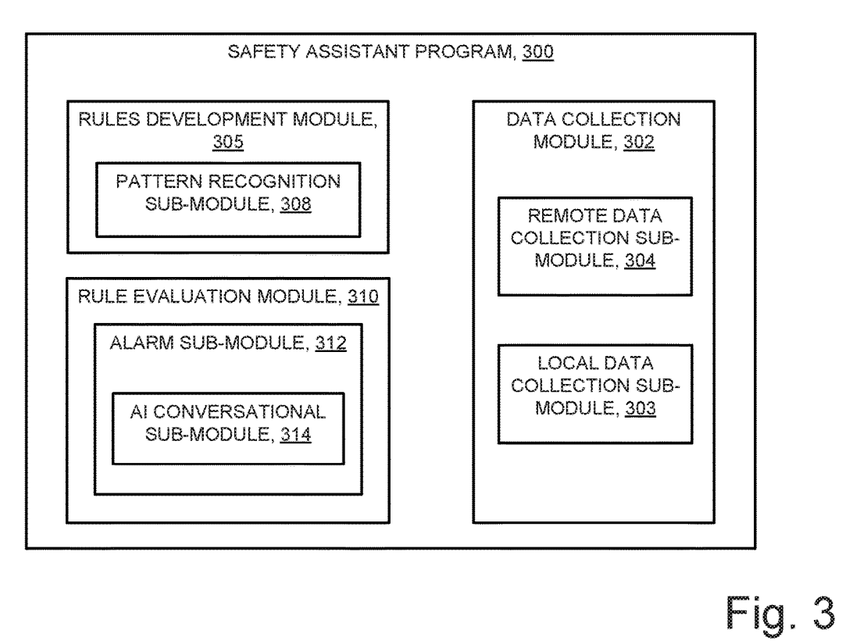
FIG. 3 is a block diagram showing a machine logic (for example, software) portion of the first embodiment system.

FIG. 2 shows flowchart 250 depicting a method according to the present invention. FIG. 3 shows safety assistant program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where rule evaluation module 310, of safety assistant program 300, receives information identifying members of device set 112, and a set of rules (herein referred to as a rule set) based on patterns of locations and movements (herein referred to as respective history profiles) of multiple, related electronic devices (for example smart phone 104, smart watch 106 and vehicle navigation system 108, collectively device set 112, see FIG. 1). In general, a rule specifies at least: (i) criteria for detecting a deviation between current data and a history profile, and (ii) a responsive action to be taken in the event that the deviation occurs. Further with respect to item (i) above, criteria for detecting a deviation, in some embodiments, involves the history profiles of many, or all, of the members of device set 112. That is, the relative relationships between and among members of device set 112 are primary inputs for detecting the deviation.

In some embodiments of the present invention, all member devices of device set 112 share a common registration identifier. Alternatively, in some embodiments, members of the device set may be identified by respective unique identifiers (for instance, respective media access control (MAC) addresses) registered in a central location (such as data store 120, see FIG. 1), or by replicating, across at least some members of the device set, the respective identifiers of other member devices. In any case, there is at least one device, that may or may not be included in the device set (for instance, a central computer such as server computer 200, see FIG. 1), that can identify and communicate with some or all members of the device set. Device set 112 may include smart phone(s), smart watch(es), global positioning system (GPS) unit(s), vehicle navigation system(s), tablet computer(s), and all manner of mobile devices capable of communications among and between each other (whether via peer to peer, near field, or via network communications, to name a few examples). Members of device set 112 include devices owned, used by, and/or assigned to persons responsible for the care and well being of a child or other dependent. Some members of device set 112 may further be owned, used by, and/or physically accompany a dependent as well.

In some embodiments, to initiate device set 112, the members-to-be (of the device set) each receives and/or installs the application software (for example safety assistant program 300, see FIG. 1). Users provide input, to register each device as a member of device set 112. In some embodiments, a ramp up mechanism identifies family members through data collection. For example, the ramp up mechanism identifies those members as going to a daycare location (in the process, providing evidence that there is a dependent person under the care of the family members). In some embodiments, the system identifies other persons coming to the family home and requests information to determine whether they are in charge of the dependent person. Determining which devices are members of the device set is based on the fact that they share, or commonly frequent a common home location (for example, the home of a dependent person). In some embodiments, any given member of device set 112 may have memberships in any number of different device sets, where each device set operates independently of the others. One example would be a family member who also babysits for another family who have their own independent implementation of safety assistant program 300.

In some embodiments of the present invention, each member device installs at least one component of safety assistant program 300. For example, some members of device set 112 install and host an instance of local data collection sub-module 303. In some embodiments, safety assistant program 300 is embedded in the mobile device, for instance as part of the device operating system, or as pre-installed application, and therefore does not need to be downloaded or installed by the user.

Local data collection sub-module 303 records the ongoing history profile of the hosting device and sends the history profile data to data store 120. With respect to the hosting device, the history profile data may include GPS locations and respectively corresponding time stamps, cell tower connection history, velocity profiles (a record of travel directions and speeds), routes traveled, and a history of WiFi hotspots detected by the local device, to name a few examples.

Remote data collection sub-module 304, in contrast to local data collection sub-module 303, may reside in a central location (such as server computer 200, see FIG. 1), or it may be distributed among more than one computer. In some embodiments, remote data collection sub-module 304 gathers data, with respect to members of the device set, that is generated by devices external to the respective member devices. For example, as smart phone 104 (see FIG. 1) is taken around an urban setting, over time, various WiFi hotspots and cell towers (nodes of a cellular telephone network, for instance) may detect the presence and/or passing of the smart phone. Remote data collection sub-module 304 may periodically poll the WiFi hotspots and cell towers to discover the data with respect to smart phone 104, and send this data to a central location (such as data store 120, see FIG. 1), and/or to at least some other members of the device set, to add to the history profile data of smart phone 104. Remote data collection sub-module 304 also receives, through WiFi communications or radio broadcast for instance, environmental information such as outside temperature, cloud cover, precipitation, etc.

On an ongoing basis, device history profile data collected by both local and remote data collection sub-modules (303 and 304) is sent to (and/or retrieved by) data store 120 (see FIG. 1).

Based in part on history profiles stored in data store 120, pattern recognition sub-module 308, of rules development module 305, discerns patterns of movements with respect to members of the device set. In some embodiments, patterns are recognized through cognitive analysis techniques. In some embodiments, the cognitive analysis techniques incorporate interaction with users to augment and refine pattern recognition results. The cognitive analysis takes into account movements of the various devices individually, but also in relation to each other, to discover regular patterns and relationships such that rules can be developed and used to detect deviations from the patterns. A pattern may comprise aspects of a mobile device's real-time status that can be predicted based on past observations.

In some embodiments of the present invention, rules development module 305 develops the rule set based on patterns recognized by pattern recognition sub-module 308, in combination with user interaction and other inputs. Other inputs can include information derived from many, and diverse, sources and factors such as a local school schedule, weather conditions, planned user vacations and holidays, etc.

As a simplistic example scenario, pattern recognition sub-module 308 recognizes a daily (on weekdays, but not on weekends) pattern in the history profile of a smart phone (for example, a phone carried by one parent) and its relative position with respect to another smart phone (for example, one carried by the other parent). Rules development module creates RULE-01 with regard to the pattern. RULE-01 includes criteria against which to measure actual status of the smart phones, and responsive actions to perform respectively upon certain levels of deviation between the actual status of the phones, and the expected status criteria. In some embodiments, responsive actions include making further inquiries (for instance via artificial intelligence (AI) conversational sub-module 314) to determine if the dependent is safe, followed if warranted, by triggering of an alarm response. In some embodiments, the system autonomously sets about finding the reason why the first person in charge of the dependent is not behaving as expected. The system performs a series of fact-finding actions, until it can verify the safety of the dependent, or if failing to make that verification, triggering the alarm sequence specified in RULE-01.

Rule evaluation module 310 evaluates RULE-01 based on the real-time data supplied by data collection module 302 and sub-modules included therein. Rule evaluation module 310 determines that there is a deviation between the actual status of the smart phones and the criteria encoded in RULE-01. RULE-01 specifies a low level alarm response to the deviation. Alarm sub-module 312 triggers the low level alarm. In response to the alarm, AI conversational sub-module 314, of alarm sub-module 312, of rule evaluation module 310, initiates a user interface session, for instance via text messaging or automated voice response system, to ask for user input to explain the reason for the deviation from the recognized pattern. AI conversational sub-module 314 listens for a user response. Depending on the user response (or lack thereof), a higher level alarm is triggered. In this scenario, the user response indicates that the day in question is a holiday and the dependent is safe at home. Rules development module 305 develops a new rule (or refines RULE-01) to incorporate this new information, and adds the new information to the relevant history profile(s) for the smart phone, and for other members of the device set that may be impacted by the new information.

Further discussion with respect to the rule set is presented below in the Further Comments and/or Embodiments sub-section of this Detailed Description section, with reference to FIG. 4.

Processing proceeds at operation S260, where local data collection sub-module 303 and remote data collection sub-module 304, of data collection module 302, continuously monitor current status of members of device set 112, in real time, or near real time. Data collection module 302 continuously, or periodically (for example once every 60 seconds) sends any new data collected during the monitoring, to data store 120. Pattern recognition sub-module 308, of rules development module 305, monitors new information flowing into data store 120, to determine if new patterns emerge or if existing patterns have changed. In either case (new or changed patterns), rules development module 305 may (depending on the nature of the new information) update the rule set in accordance with the new or changed patterns.

Processing proceeds at operation S265, where rule evaluation module 310 determines if there is a deviation between an established pattern and real time data inputs. If a deviation is detected, rule evaluation module 310 sends a deviation signal to alarm sub-module 312. In some embodiments of the present invention, rule evaluation module 310 periodically (meaning at meaningful time intervals, for example every 30 seconds, or triggered upon receipt of new history profile information by data store 120) evaluates the rules of the rule set (in serial or parallel fashion), taking as input at least: (i) real time data inputs (information collected in operation S265 above); and (ii) history profiles of members of the device set.

Processing proceeds at operation S270, where, upon receiving a deviation signal from rule evaluation module 310, alarm sub-module 312 issues an alarm as specified in the rule (or rules) by which the deviation is detected (the alarmed rule). In some embodiments, there are three alarm levels: local, global, and physical. A local alarm may comprise sending a text or voice message to the member of the device set about which the deviation was detected (the deviating device), or even initiating an AI conversation with the caregiver to awaken them from their absent mindset. For example, if the deviation involved the time/location of a smart phone that deviated from an established pattern, alarm sub-module may send a text or voice message to that phone intended to remind the user (the deviating user) to recheck their vehicle for any persons inadvertently left behind in the vehicle. A global alarm may comprise sending a text or voice message to multiple devices, intended to alert the deviating user and other users as well, so that the other people can check in with the deviating user and inquire about, and address, the cause of the alarm. In some embodiments, a physical alarm level may involve sending an actuating signal to a physical device (an automobile, for example), to cause an action (such as specified in the alarmed rule), such as locking or unlocking the vehicle doors, opening or closing the windows, sounding the vehicle horn, opening a voice communication channel between the deviating device and the vehicle, or flashing the headlights and tail lights, to name a few examples. The type of alarm that is triggered depends on the combination of hazard potential and risk of false positive.

Processing proceeds at operation S275 where alarm sub-module 312 listens for a response to the local alarm issued in operation S270 above. For example, the local alarm may include instructions, to the deviating user, to acknowledge receipt of the local alarm. The deviating rule may specify a waiting period for the acknowledgement, and a response associated with the acknowledgement, or lack of acknowledgement. If no acknowledgement is received within the waiting period, the deviating rule may specify a heightened alarm response.

Processing proceeds at operation S280, where alarm sub-module 312 issues a heightened alarm, such as a global alarm and/or a physical alarm (discussed above with respect to operation S270). Note: the terms "alert" and "alarm" are herein considered synonymous and are used interchangeably.

III. Further Comments and/or Embodiments

Some embodiments of the present invention have three phases: (i) data collection and learning; (ii) data analysis/rule making; and (iii) monitoring/alerting/refining. Over time, these phases continue running in parallel whereby the rules are continually refined as new information is gathered, and as established patterns evolve and change. The system continues monitoring indefinitely to concurrently collect new data, analyze the data, and refine the rule set (to detect and incorporate new situations and behaviors).

During the data collection phase, the system collects input data regarding the behavior of family members and other persons in charge of a dependent's care. Data collected includes: (i) home locations, work locations, daily habits, travel routines and patterns, etc. (of family members and caregivers). The data is collected by an application (app) downloaded to, and running on, personal devices such as smart phones, smart watches, wearable devices, global positioning system (GPS) devices, etc. In some embodiments, a service provider downloads the app to certain devices automatically, according to policy or device configurations.

Once the history is collected, the system identifies deviations in the daily routine, such as neither parent stopping at the childcare facility when one parent or the other is expected to do so according to the established pattern. In some embodiments, if an abnormal behavior is detected, the system performs responsive actions. For example, consider a situation where, of two caregivers, one or the other, according to the collected data, is expected to travel to, and stop briefly at, the location of a daycare facility, and then to travel on to a work location. But one warm sunny morning, both caregivers travel directly to respective work locations and park their cars. The system detects this deviation from the expected behavior, and responds by: (i) triggering both cars to lower their windows a predetermined amount (such as 2 to 3 centimeters for example), based on the warm temperature, and a local forecast for clear skies; and (ii) sends an automated phone call message to the mobile devices belonging to both caregivers, and a wider selection of other persons who may be able to respond. The automated message indicates that the normal routine was not followed and a dependent may have been left unattended in the car. The people who answer the phone calls may respond to indicate that the routine was intentionally changed that particular day, for a particular reason, and the dependent was kept at home. The system saves these responses to help refine the alerting rules. Further, the system analyses responses from the various respondents to determine the degree of agreement or disagreement among them, and uses this information to determine what further alerting actions, if any, the system will take. For example, if some respondents indicate that the dependent went to daycare with a primary caregiver, and the primary caregiver gives contradictory information, stating for instance that he dropped off the child at the daycare facility, when there is evidence that the car had not stopped at the daycare location, the system sends a second alert to all members of the device set, including the primary caregiver's device, indicating that they should immediately return to the car and check to confirm the presence or absence of the dependent in the car. In such a situation, in fact, the system has all the needed information to determine that there is high danger with a low risk of false positive: it has both the information that the father should have dropped off the child and that he did not do so. Further, the automated messages may prompt the recipients into communicating among themselves to definitively establish among themselves the whereabouts of the dependent and whose care it is currently under.

In some embodiments of the present invention, system alert response may include for example, immediate actions that can be carried out by a vehicle itself, such as, for instance, lowering the windows. In this case instrumentation may be needed on the vehicle to receive a command signal and to carry out the command.

In some embodiments of the present invention, the system escalates the severity of alerts, by expanding the population of recipients to whom the alert messages are sent, even to the extent of alerting law enforcement officials, hospitals, etc., nearby to the location where the vehicle is located. In some embodiments, the system attempts to identify and notify persons who can reach the vehicle in the shortest time. In some embodiments, a person who presumably left the dependent in the vehicle is not allowed to stop the emergency escalation. In some embodiments, the system can send alarms to devices outside of the device set (belonging to persons outside the family circle), for example to persons who register as volunteer members of a broader community of potential life savers.

Some embodiments of the present invention trigger different levels of alarming (and lifesaving actions) based on the level of the alert, weighed against the risk of a false positive. A risk of a false positive is a probability, specified in a given rule, that the rule, based on the current status(es) of the specified communication devices, will trigger an alert condition when in fact the alert condition is not warranted. For example, a false positive might occur if a rule, when evaluated against current status(es) of specified smart phone (s), determines that a dependent has been left unattended in a vehicle when in fact the dependent is safe and sound at home. In some embodiments, a high false positive risk factor weighs in favor of lowering the severity of an alert condition, whereas a low false positive risk factor does not. In other words, a high false positive risk raises the threshold criteria for issuing an alert response, whereas a low false positive risk lowers the threshold criteria for issuing an alert response.

Some embodiments of the present invention comprise a conversational AI module, such as AI conversational sub-module 314 (see FIG. 3) that may conduct a dialog (for example via text messaging or automated voice messaging) with a person who may have left a dependent unattended in a vehicle, and/or with person(s) who may be able to respond to, evaluate, and/or correct (if necessary) the situation.

Some embodiments of the present invention may include one, or more, of the following features, characteristics, and/or advantages: (i) identifies a level of danger (pair deviation from routine vs. false positive) of a particular situation, and triggers a subsequent alert; (ii) uses feedback (both for learning and alerting) to refine its decisions; and/or (iii) leverages information from a network of persons to obtain greater insight into a given situation.

Some embodiments of the present invention may recognize one, or more, of the following facts, potential problems, and/or potential areas for improvement with respect to the current state of the art: (i) in some cases where a dependent has been inadvertently left unattended in a vehicle, there had been a deviation from a daily routine; (ii) in some cases where a dependent has been inadvertently left unattended in a vehicle, a caregiver was in a stressful state of mind and did not recognize an alarming situation; (iii) some motion-detection systems (that are intended to alert a parent if motion is detected in the car after the parent has left the car) may not be deployed or may not be effective because: (a) they were not acquired, not installed in the vehicle, and/or not activated, (b) they may not be used by older children, (c) often, people don't acquire them; and/or (iv) the standard emergency contacts may not be reachable.

Some embodiments of the present invention may include one, or more, of the following features, characteristics, and/or advantages: (i) deployed as easily as downloading an application program (app); (ii) based on detection of deviations to the daily routines; (iii) sends alarms to a wide array of recipients; (iv) starts an escalation of life saving interventions both in a vehicle itself and outside to members of the community; (v) triggers a cognitive interaction with a caregiver to awaken the caregiver's attention and make them aware of a potentially hazardous situation; (vi) collects input regarding the behavior of the family and other persons in charge of a dependent's care, where these inputs comprise the family members' comings and goings, home location of the family and of other caregivers, work, and school locations, usual routes traveled by family members, etc.; (vii) carries out data collection by means of an application program (app) installed on personal devices, such as smart phones; (viii) requires no manual intervention from users, besides downloading the app., and responding to alerts; (ix) applies different, and escalating, levels of alarming (and lifesaving actions), based on the level of alert detected AND on the risk of false positive; and/or (x) starts a conversational dialog, driven by artificial intelligence, with a person who left the dependent alone. Further with respect to item (i) above, in some embodiments, the application program is embedded in the mobile device, for instance as part of the device operating system, or as pre-installed application, and therefore does not need to be downloaded or installed by the user.

If an alarm condition is triggered, some embodiments begin an escalation of alerts, contacting the community of persons using the system (including persons who may not know the family) such as colleagues, authorities, hospitals, etc. In some embodiments, the person(s) that the system decides to warn are those who the system has determined may be able to reach the vehicle in the shortest amount of time. In some embodiments, the person who presumably left the dependent in the car is denied the ability to stop the emergency escalation, in case that person (perhaps due to distraction, inattention, or preoccupation with other matters) believes, incorrectly, that the dependent is being properly cared for when in fact that is not the case.

Some embodiments of the present invention may include one, or more, of the following features, characteristics, and/or advantages: (i) takes an aggregate view of the behavioral patterns of an entire family; (ii) detects deviations from the aggregate view to determine if safety of a dependent may be at risk; (iii) takes into account combined information acquired from more than one source (for example, from the mother and the father); and/or (iv) identifies a view of a situation that takes into account all the persons involved in a dependent's care.

Some embodiments of the present invention have three phases: (i) learning, rulemaking; (ii) deviation detecting; and (iii) alarming. These phases will be discussed below, with reference to FIGS. 4, 5A and 5B.

LEARNING PHASE—learning behavioral patterns of the family; creating rules based on the behavioral patterns.

As used herein, the term "family" refers to a set of individuals who are directly or indirectly responsible for the care and wellbeing of a dependent person or animal. Members of a family may include parents, siblings, grandparents, babysitters, neighbors, etc. of a dependent person such as a child.

1. Identify persons and locations

1(a). Identify all persons involved in the care of the dependent (for example, father, mother, grandparents, nanny, babysitter, siblings, etc.). In some embodiments, this information is established by linking the various communications devices (smart phones, tablet computers, smart vehicles, etc., referred to here as mobile devices) regularly carried or driven by the various persons. Once linked, mobile devices are collectively herein referred to as a device set, and individual devices in the device set are referred to a members of the device set. Members of the device set may be linked by registering each device with a central computer or database. In some embodiments, the linking is accomplished by cross-registering each member of the device set with some or all of the other members. Each member of the device set may also be registered as belonging to a person who regularly carries it.

1(a)(i). The identification process of paragraph 1(a) above, may involve automatic detection of persons (or more precisely, detection of mobile devices carried by the persons) who share the same household, or visit the house on a regular basis and/or who are involved in the care of the dependent person. These persons are considered to belong to the dependent person's family circle.

1(a)(ii). The identification process of paragraph 1(a) above, may involve user interaction where the system asks questions and receives responsive user input. The interaction may involve text or voice messages sent to members of the device set, and text or voice user inputs received back in response. In some embodiments, the system uses voice synthesis to generate outgoing messages, and uses voice recognition techniques to process voice messages received back in response to extract meaningful information therefrom. The object of the questioning may be directed to learning about the relationships among members of the household (members of the family circle) and visitors thereto, as well as to gaining information about daily routines followed by those persons.

1(b). Identify all locations frequented by members of the family circle (for example, house, offices, places of employment, school, shops, gym, etc.)

2. Mark daycare locations (daycare facility, kindergarten, grandparents' house, nanny's house, etc.), and record the usual amount of time taken to transport the dependent from one location (for example, home) to another location (daycare facility), and the usual dwell time (the time needed to drop off the dependent) at the daycare location. This information may be useful toward understanding whether the dependent has indeed been dropped off.

2(a). In some cases, the system learns the information gathered in paragraph 2 above by automatically referencing and correlating information gleaned from internet sources, GPS information, etc., for example.

2(b). In some cases, the system may request and receive user feedback as to the who, what, when, where, why, and how with respect to movements of members of the device set (implying movements of the persons carrying the devices) and how these movements are related to the care and transport of the dependent person.

3. The system constructs a multi-dimensional representation of the comings and goings of persons involved in the care of the dependent. In some embodiments, this representation concentrates on a position versus time profile of a caregiver over a meaningful time period (for example a month long period). In some embodiments, the multi-dimensional representation is a directed graph (digraph) or multigraph where nodes represent locations, and edges represent movement of the mobile device from one location to another. In some embodiments, an edge between two nodes are weighted according to the regularity vs. irregularity of the mobile device's movements between the two nodes. In some embodiments, the multi-dimensional representation comprises a tabular data structure such as a database table or a weekly schedule. The foregoing examples are merely some of many ways to represent the data, all in keeping within the scope of the present invention. In some embodiments, the data is concurrently represented in multiple ways and analyzed by reference to which ever representation(s) is (are) most appropriate to the goal of a particular analysis.

3(a). The system collects daily information regarding all the persons in the family circle who, for example, stopped at the daycare location.

3(b). The system collects daily information regarding all the persons in the family circle (babysitter, grandmother, etc . . . ), who for example, came to the house, in an unusual departure from the normal routines, for example to take care of the dependent who is ill and stayed home one day instead of going to the daycare facility. The system may request and receive feedback to explain the nature of the unusual circumstance.

Figure 4A:
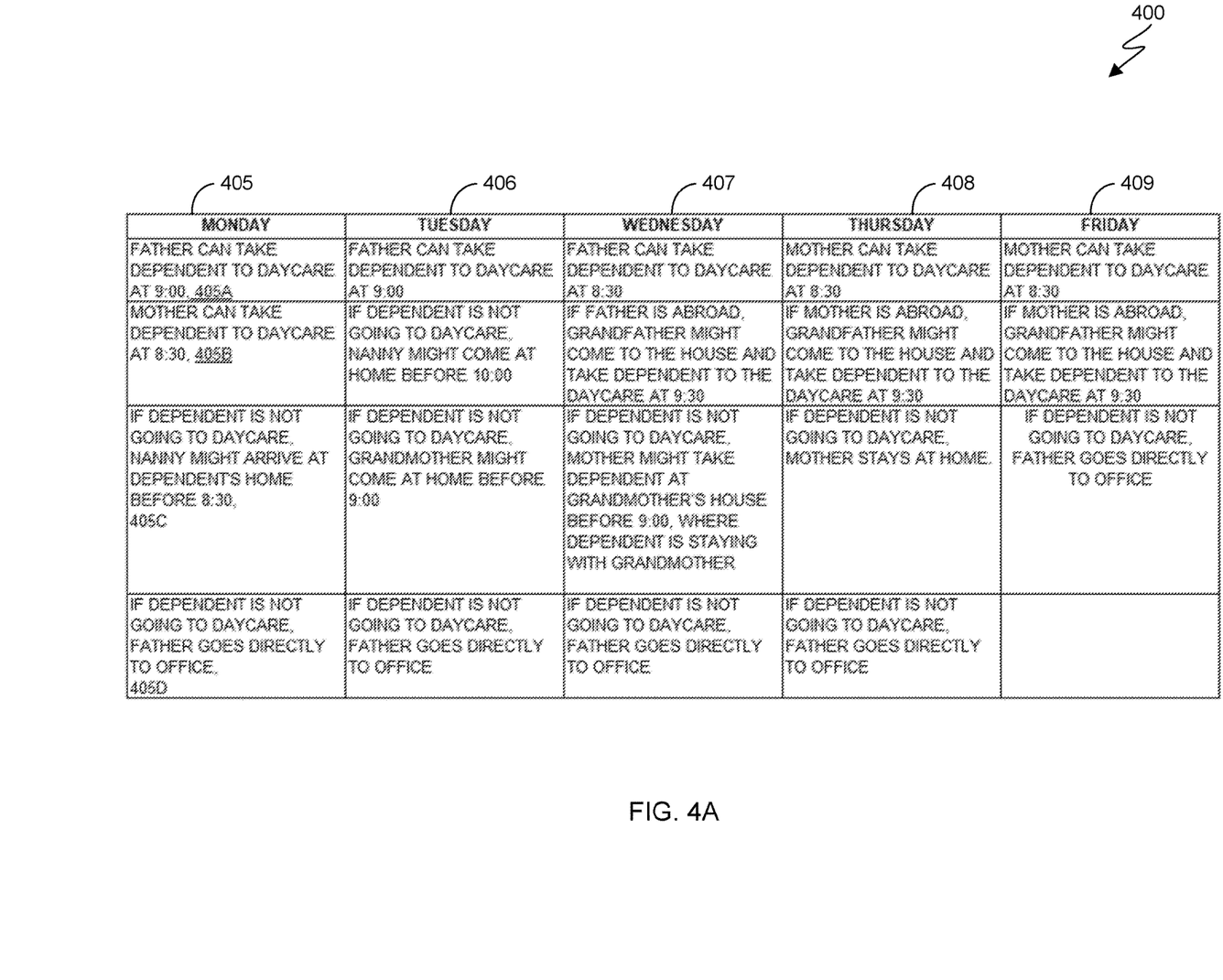
FIG. 4A is table showing information that is helpful in understanding embodiments of the present invention.

Table 400 of FIG. 4A summarizes an example set of observations upon which development of a rule set is based in some embodiments of the present invention. Rules development module 305, of safety assistant program 300, develops the rule set using cognitive computing or other machine learning techniques, based in part on observations made over time by data collection module 302 and sub-modules thereof (see FIG. 3). Alarm sub-module 312 of rule evaluation module 310 of safety assistant program 300 (see FIG. 3), determines whether to initiate an alarm sequence based on evaluations of the rules in view of current data gathered during ongoing monitoring conducted by data collection module 302. FIG. 4B shows an application of a rule based on the data in column 405 FIG. 4A. These data and rule applications will now be discussed, over the course of the following paragraphs, with reference to FIG. 4A (for the observed data) and FIGS. 4B and 4C (for applications of the rules).

Figure 4B:
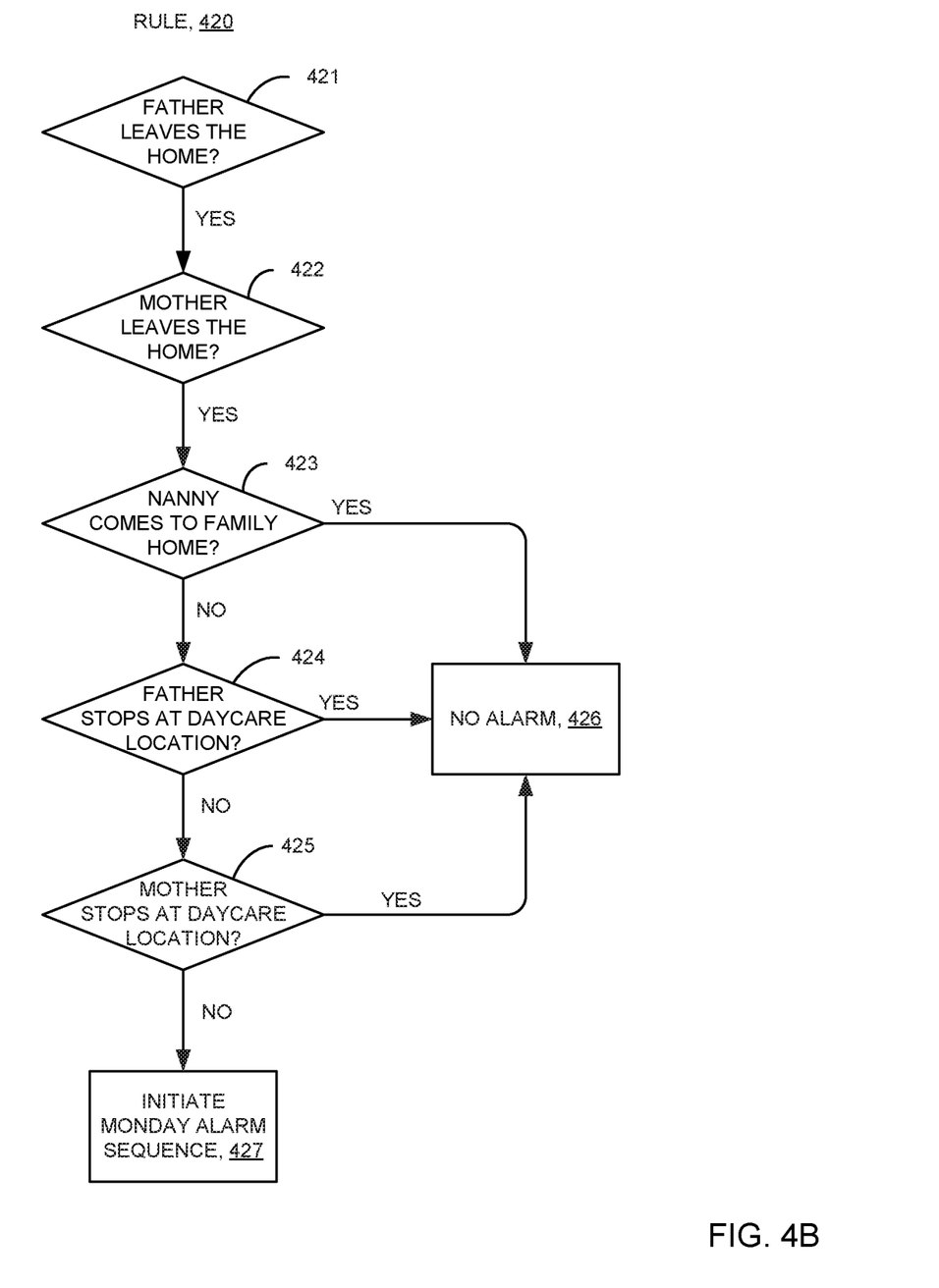
FIG. 4B is a flowchart showing a second embodiment method performed, at least in part, by a second embodiment system.

Rule 420 of FIG. 4B, is based on data summarized in Monday column 405 of Table 400. If any of the following conditions is true, alarm sub-module 312 (see FIG. 3) does not raise an alarm (no alarm 426): (i) the dependent's father (or more precisely, a smart phone carried by the father) travels to a daycare location, within a specified time window, and stops there (decision 424, "Yes" branch); (ii) the dependent's mother travels to the daycare location, within a specified time window, and stops there (decision 425, "Yes" branch); or (iii) the dependent's nanny (babysitter) arrives at the family home within a specified time window (decision 423, "Yes" branch).

If, on the other hand, all of the following conditions are true, alarm sub-module 312 initiates Monday alarm sequence 427: (i) the father leaves the family home (decision 421, "Yes" branch); (ii) the mother leaves the family home (decision 422, "Yes" branch); (iii) the nanny (babysitter) does not come to the family home (decision 423, "No" branch); (iv) the father does not stop at the daycare location (decision 424, "No" branch); and the mother does not stop at the daycare location (decision 425, "No" branch).

In some embodiments, Monday alarm sequence 427 comprises sending, by alarm sub-module 312, text messages to the mother and the father asking them if they are sure the dependent has not been accidentally left unattended at home (inside or outside) or in a vehicle, etc. Alarm sequence 427 further comprises contacting the daycare facility, by text message or automated voice response messaging, for instance, to inquire as to whether the dependent had been dropped off. This component of the alarm response is designed to elicit a response independent of the mother and father, because in some circumstances, both parents might believe the other had delivered the dependent to the daycare facility when in fact neither had done so. Moreover, if for instance, a family friend, who is not registered in the system, had been asked to take the dependent to the daycare facility, both parents could reasonably believe that the dependent had been taken there, but the family friend may have had a lapse of attention and forgotten that they have the dependent in their care. Alternatively, the family friend may have indeed safely delivered the dependent to the daycare facility, but because the friend's mobile device had not been registered as a member of the device set, the safe delivery is not detected by the system. In either case, the system is not able to determine whether the dependent had been dropped off at the day care facility. But by contacting the daycare facility directly, the system can get the most reliable information as to whether they have received the dependent, information on which to base further actions (for instance escalating or cancelling the alarm). If warranted, alarm sub-module 312 escalates the alarm level and contacts both parents, as well as other potential identified caregivers (such as nanny, grandmother, and grandfather), via text message or automated voice messages, informing each recipient that there may be confusion over who is watching over the dependent, and urging the recipients to investigate and take any appropriate action to ensure the dependent's safety.

The information shown in table 400 indicates circumstances under which none of the persons under observation, that is the caregivers (mother, father, nanny, grandparents, etc.), travel a route that leads to the kindergarten/daycare location (or arrives at the daycare location by any route). Under these circumstances the algorithm observes that usually: (i) on Mondays (column 405) the nanny travels to the family's home; (ii) on Tuesdays (column 406) the grandmother travels to the family's home; (iii) on Wednesday (column 407) the mother travels the route to the grandmother's home; (iv) on Thursday (column 408) the mother stays at the family's home, etc.

If rule evaluation module 310 detects a deviation from the normal pattern, alarm sub-module 312 (see FIG. 3) initiates an alarm sequence in accordance with the governing rule or rules by which the deviation was detected.

If rule evaluation module 310 detects a deviation, the reason for the deviation may be acceptable (for example, the dependent is not taken to the daycare facility on a given day due to illness). Or the deviation may indicate a dangerous situation against which embodiments of the present invention are intended to guard. For example, consider a father who secures the dependent into the car intending to drop it off as usual at the daycare facility. But during the trip, the father's thoughts become preoccupied with a problem at work, forgetting that the dependent is in the car. He drives directly to work, bypassing the daycare facility, and inadvertently leaves the dependent unattended in the car. On some days, the mother instead would have taken the dependent to the daycare facility, but on this day, she too drives directly to work. In such a situation where neither parent stops at the daycare facility, some embodiments of the present invention alert the mother and the father, but importantly, other potential caregivers as well, to stimulate and encourage prompt intervention and avoid a potential tragedy.

Some embodiments of the present invention have additional learning capabilities. For example, the application can run in background and detect (through user input or other means): (i) a child's birth (hospital location); and (ii) when the child starts going to daycare, activating itself at that time.

In some embodiments of the present invention, an alarm sequence calls for user feedback. Feedback may indicate, for example, that the deviation which triggered the alarm is benign (such as a one-time intentional schedule change). Or the feedback may indicate that the alarm did indeed lead to prevention of a tragedy. In any case, feedback may or may not be mandatory, but any feedback received can be used to enhance the detecting and alarming rules, to enable making more confident decisions in shorter timeframes, (that is, shortening the study (learning) phase).

In some embodiments each row of table 400 (FIG. 4A) is a possible alternative, being one or the combination (aggregation) of the following types or forms of generic rule:

If [condition 1], [Caregiver 1] takes child to [Location] at/before [Time].

If [condition 2] child stays at [Location] with [Caregiver 2].

A rule is identified for any given day (or any other meaningful time interval). The rule represents a constraint, and the violation of constraints triggers an alarm response.

The schedule presented in table 400 of FIG. 4A gives an example of combined (aggregated) information as gathered during a learning phase (and potentially subsequently modified based on continued monitoring):

An example rule set may include a "MondayRule", a "TuesdayRule", etc. (not separately shown in the Figures), based on the observations respectively tabulated in columns 405-409. In some embodiments, the MondayRule (sometimes herein referred to as "Monday constraint") is expressed in an extensible markup language (XML) type format.

In the embodiment of FIG. 4A, Monday constraint (column 405 of FIG. 4A) may be interpreted as follows:

Father takes child to daycare before 9:00 am before proceeding to Father's work location, (405A)

OR

Mother takes child to daycare before 8:30 am before proceeding to Mother's work location, (405B)

OR

Nanny arrives at child's home by 8:30, (405C)

If child is not supposed to go to daycare (if, for example: (i) the daycare facility is closed; (ii) the child is ill; (iii) the child is kept at home for any reason, etc.), Father goes directly to the Father's work location, (405D).

Constraints for Tuesday, Wednesday, Thursday, and Friday (respectively columns 406-409) are defined in a similar manner as the Monday constraint.

DEVIATION DETECTING PHASE—evaluating the rules based on current status.

Deviation detecting aims at determining whether deviation from a regular, established pattern has occurred, for example, whether caregivers are confident that a child has been delivered to a daycare facility or not. In this example case, a rule may establish a null hypothesis such as: "the child has been dropped off at the daycare facility". A goal of the system is to disprove the null hypothesis, within a defined confidence interval (or a defined false positive risk factor). If rule evaluation module 310 (see FIG. 3) cannot disprove the null hypothesis, it does not trigger any responsive action and does not issue an alarm. If on the other hand, rule evaluation module 310 can disprove the null hypothesis (meaning the available data indicates that the child was not dropped off at the daycare facility), it triggers an alarm response. For example, if a rule under evaluation specifies that the father is supposed to stop at a daycare facility while en route to work, but no such stop has been detected, then the system determines an alert score and a false positive risk factor, the combination of which may trigger a particular alarming and escalation response. In an embodiment, rule evaluation module 310 uses the following rule evaluation logic to determine whether the Monday constraint has been violated:

IF (nanny did not come to the home) AND (father left the home) AND (mother left the home) AND (father did not stop at daycare facility) AND (mother did not stop at daycare facility) AND (time is later than 9:15 am) THEN (Monday constraint is violated).

Alarming Phase

In some embodiments of the present invention, once rule evaluation module 310 has determined that the Monday constraint has been violated, alarm sub-module 312, determines the level of response using the following logic:

IF [Temp <40° F.|40° F.≤Temp <65° F.|65° F.≤Temp] THEN [AL=10|5|10] AND FPR=5.

The response level logic determines the alert level ([AL=10|5|10]) and the false positive risk factor (FPR=5). The alert level is influenced by the prevailing environmental data, such as outside ambient conditions (in some embodiments, this information is available to safety assistant program 300 (see FIG. 3) via data store 120 (see FIG. 1). The response level logic sets forth above has three levels of alert as follows: (i) if the outside temperature is lower than 40° F. (4° C.) [Temp <40° F.], then the AL=10 (highest level); (ii) if the outside temperature is between 40° F. (4° C.) and 65° F. (18° C.) [40° F.≤Temp <65° F.], the alert level is set at 5 (a moderate level); and (iii) if the outside temperature is higher than 65° F. (18° C.), AL=10. In some embodiments, the number of alert levels and the associated criteria for determining the alert level, may be the same, more or fewer than the three levels given in the present example. In some embodiments, data collection module 302 (via at least sub-modules 303 and 304) monitors certain environmental factors such as weather data, which is received from various sensors (ambient light, temperature, humidity, etc.) such as may be integrated in the monitored devices, or in weather stations, or from other sources such as on the internet.

The response level logic further determines the false positive risk factor (FPR). In this example, FPR is independent of the alert level because the FPR is based on the observed behaviors of the mother, father and nanny without regard to the environmental conditions. In this example, FPR is set at 5 which is a moderate false positive risk (on a scale of 1 (lowest FPR) to 10 (highest FPR)). In some situations, a high FPR risk may (depending on circumstances) tend to lower the alert level (to avoid excessive false alarms) while a low FPR may tend to raise the alert level, because the probability of an actual hazardous situation may be greater. A moderate FPR may not tend to affect the AL either way.

Outside ambient conditions may include air temperature, cloud cover, insolation (intensity of the incoming solar irradiance), humidity, and/or precipitation, to name a few examples. In some embodiments, this environmental data is collected by suitable sensors embedded in smart phones, smart cars, weather stations, weather condition radio/television broadcasts, etc., and subsequently transmitted to and stored in data store 120 (see FIG. 1).

In response to the example constraint violation, AI conversational sub-module 314 of alarm sub-module 312 (see FIG. 3) initiates separate automated voice call messages to the mother and the father. In some embodiments, if the alert level=5 (moderate), the message is: "The normal Monday pattern has not been followed. The child may have been left unattended at home or in a vehicle. Please double check the whereabouts of the child." If the alert level=10 (high), AI conversational sub-module 314 sends the same message to the parents and further requests feedback within a predetermined waiting period (for example 5 minutes). If the feedback is not received during the waiting period, AI conversational sub-module 314 escalates the alert level to involve more people (for example the nanny, family relatives and friends, grandparents, local authorities, etc.). If feedback is received during the waiting period, depending on the nature of the feedback, safety assistant program 300 (or modules thereof) may perform the following actions (see FIG. 3): (i) rules development module 305 may update the rule that defines the Monday constraint, particularly if the feedback indicates a change in the usual behavioral pattern(s); (ii) alarm sub-module 312 may cancel the alert; (iii) alarm sub-module 312 may raise the alert level; and/or (iv) alert sub-module may issue a radio signal to activate vehicle actuator 110 (see FIG. 1) to lower the vehicle windows. With respect to items (i) and (ii) above, feedback may comprise voice response or text message response. In the case of a voice response, AI conversational sub-module 314 (FIG. 3) processes the voice response through a voice-to-text conversion routine, then further processes the resultant text, or the text message response, through an artificial intelligence system (not shown in the Figures) to understand the meaning of the response and update the rule that defines the Monday constraint, if appropriate.

A false positive occurs when a deviation from a standard schedule (an established pattern) is detected, but where a hazardous situation, in actual fact, does not exist. Examples of situations that can create false positives include: (i) a substitute nanny (not previously included in the set of people/devices being monitored) comes to the house, whereas the regular nanny (who usually arrives at the family house if neither the mother nor the father stops at the daycare facility en route to work) does not; (ii) a mother stays at home with the child whereas normally the mother leaves upon arrival of the nanny; (iii) the mother takes the child to daycare whereas usually, the father takes the child to daycare; and/or (iv) one of the monitored devices stops providing current status updates (due to a discharged battery for instance), etc.

When a constraint is violated, rule evaluation module 310 (FIG. 3) identifies the particular situation at hand to understand the level of risk presented by the situation. The system further identifies a false positive risk (also sometimes herein referred to as a false positive score). For instance, in a situation where the father has gone to work (without stopping at daycare as usual) and the mother has stayed at home, the system is unable to determine whether the child is safe at home with the mother or whether the child has been left unattended in a vehicle. Consequently, the system may raise the false positive score.

Moreover, the system may lower the alert state in case of good weather conditions. That is, the risk to the safety of a child locked unattended in a vehicle is lower if the weather is mild, rather than extremely hot or cold. In the case of mild weather, a lower alert state may be issued. On the other hand, if the weather is extremely hot or cold, the safety risk is greater, and a quickest response by a caregiver may be called for. In this case, a higher or highest alarm may be issued, and delivered to a wider circle of recipients, to prompt a most urgent response by any available responder.

Therefore, in some embodiments, the output of the detecting phase includes at least two factors: an "alarm level" (alert score) and a "false positive risk level" upon the combination of which is based a consequent alarm (or no alarm) response level and subsequent escalation sequence.

In some embodiments of the present invention, alarming involves an escalation sequence of actions based on a combination of the alert and false positive risk scores. For instance, under a violated constraint, if there is a great risk of a false positive, then the entry point is low, such as a simple alarm to the father and mother. If instead, there are hot weather conditions combined with a low risk of false positive, then the system may immediately trigger lifesaving actions such as lowering the car's window and distributing a most urgent notification to the widest set of recipients.

In some embodiments, an alert escalation may include the following actions in response to determining that a child may have been left unattended in a vehicle:

1. Alert mother and father, ask for feedback.
2. Start, via an artificial intelligence conversational module (for example AI conversational sub-module 314, FIG. 3) to question a person who might have forgotten the child, to focus the person's attention on the whereabouts and well being of the child.
3. Alert the entire family circle.
4. If possible, force actions on the vehicle (such as lowering the windows to mitigate the inside temperature rise).
5. Alert entire community (persons at the parent's workplace, shops, nearby to the vehicle, etc.)
6. Alert authorities (such as fire/rescue squad, law enforcement, etc.)

Some embodiments of the present invention may include one, or more, of the following features, characteristics, and/or advantages: (i) identifies a danger level (based on a combination of deviation from routine and false positive risk) for a particular situation, and triggers an appropriate alert when called for; (ii) operates automatically (without human intervention) but can request user input, and use subsequent response(s) to refine rules (both for learning and alerting) for making decisions; (iii) leverages information received from a network of persons (or more precisely, mobile devices carried by or that otherwise accompany the persons) to obtain greater insight into a particular situation; (iv) infers the location of a dependent based on routine patterns and caregivers' respective positions; (v) detects potentially dangerous deviations from the behavioral patterns of a group of caregivers; (vi) may apply an escalating series of alarm levels; (vii) modifies alarm level response based on false positive risk; (viii) attempts to send alert(s) to caregiver(s) or other interested person(s) who are identified as closest to the dependent's inferred location; (ix) sends escalating levels of alarm to persons in a respectively widening radius about the dependent's inferred location; and/or (x) can be embedded in the default configuration of any smart phone, tablet computer, etc.

Some embodiments of the present invention may include one, or more, of the following features, characteristics, and/or advantages: (i) reduces the chances that a child (or other dependent person) is accidentally left unattended inside a closed vehicle; (ii) automatically acquires, during at least a learning phase (and continually updates), behavioral patterns of family members and other caregivers responsible for wellbeing of a dependent person, by monitoring locations and movements of mobile devices accompanying the caregivers; (iii) determines a confidence factor with respect to a dependent's location and whether the dependent is safe, by detecting constraint violations (deviations from the patterns learned in item (ii) above); (iv) computes an alert score and false positive risk factor in the event the dependent (or other person) is determined to be in an unsafe situation (a false positive is a detected deviation from in a routine pattern (learned in item (ii) above) that in fact is not a hazardous situation); (v) sends an alarm at a given level (type of communication medium (text message, voice message, alarm sound, etc.), and to a potentially widening circle of contacts (immediate caregiver, family members, others)) based on a combination of the alert score and the false positive risk determined in item (iv) above.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving information that identifies a plurality of communication devices including a first communication device, and a second communication device;
   receiving a history profile, including information indicative of a plurality of relationships, over time, between the first communication device and the second communication device;
   predicting, based at least in part on the history profile, an expected relationship status between the first communication device and the second communication device during a specified time window;
   receiving, during the specified time window, information indicative of a current relationship status between the first communication device and the second communication device;
   determining that the current relationship status is not in accordance with the expected relationship status during the specified time window;
   in response to determining that current relationship status is not in accordance with the expected relationship status during the specified time window, initiating a first alarm sequence.

2. The method of claim 1, wherein the first alarm sequence comprises:
   sending a first alarm signal to the second communication device;
   listening for a response signal, responsive to the first alarm signal, that arrives within a predetermined time threshold; and
   in response to not receiving the response signal within the predetermined time threshold, sending a second alarm signal to a third communication device.

3. The method of claim 1, wherein predicting the expected relationship status between the first communication device and the second communication device during the specified time window further comprises:
   identifying a relationship, of the plurality of relationships, that repeats, over time, on a predictable basis, to generate a predicted relationship dataset; and
   storing the predicted relationship dataset.

4. The method of claim 1, wherein a history profile of a communication device comprises a plurality of vectors where each vector of the plurality of vectors includes information indicative of a plurality of properties of the communication device, where each property of the plurality of properties is selected from the group consisting of: a geographic position; a velocity; a time; a duration; a rate of travel; a direction of travel; and establishment of a link with a communication network.

5. The method of claim 1, wherein a current status of a communication device comprises a vector where the vector includes information indicative of a plurality of properties of the communication device, where each property of the plurality of properties is selected from the group consisting of: a geographic position; a velocity; a time; a duration; a rate of travel; a direction of travel; and establishment of a link with a communication network.

6. The method of claim 5, wherein a relationship status between the first communication device and the second communication device comprises information indicative of a vector of the first communication device at a given time, relative to a vector of the second communication device at the given time.

7. A computer program product comprising a computer readable storage medium having stored thereon program instructions programmed to perform:
- receiving information that identifies a plurality of communication devices including a first communication device, and a second communication device;
- receiving a history profile, including information indicative of a plurality of relationships, over time, between the first communication device and the second communication device;
- predicting, based at least in part on the history profile, an expected relationship status between the first communication device and the second communication device during a specified time window;
- receiving, during the specified time window, information indicative of a current relationship status between the first communication device and the second communication device;
- determining that the current relationship status is not in accordance with the expected relationship status during the specified time window;
- in response to determining that current relationship status is not in accordance with the expected relationship status during the specified time window, initiating a first alarm sequence.

8. The computer program product of claim 7, wherein the first alarm sequence comprises program instructions to perform:
- sending a first alarm signal to the second communication device;
- listening for a response signal, responsive to the first alarm signal, that arrives within a predetermined time threshold; and
- in response to not receiving the response signal within the predetermined time threshold, sending a second alarm signal to a third communication device.

9. The computer program product of claim 7, wherein predicting the expected relationship status between the first communication device and the second communication device during the specified time window further comprises program instructions:
- identifying a relationship, of the plurality of relationships, that repeats, over time, on a predictable basis, to generate a predicted relationship dataset; and
- storing the predicted relationship dataset.

10. The computer program product of claim 7, wherein a history profile of a communication device comprises a plurality of vectors where each vector of the plurality of vectors includes information indicative of a plurality of properties of the communication device, where each property of the plurality of properties is selected from the group consisting of: a geographic position; a velocity; a time; a duration; a rate of travel; a direction of travel; and establishment of a link with a communication network.

11. The computer program product of claim 7, wherein a current status of a communication device comprises a vector where the vector includes information indicative of a plurality of properties of the communication device, where each property of the plurality of properties is selected from the group consisting of: a geographic position; a velocity; a time; a duration; a rate of travel; a direction of travel; and establishment of a link with a communication network.

12. The computer program product of claim 11, wherein a relationship status between the first communication device and the second communication device comprises information indicative of a vector of the first communication device at a given time, relative to a vector of the second communication device at the given time.

13. A computer system comprising:
- a processor(s) set; and
- a computer readable storage medium;
- wherein:
  - the processor set is structured, located, connected and/or programmed to run program instructions stored on the computer readable storage medium; and
  - the program instructions include instructions to perform:
    - receiving information that identifies a plurality of communication devices including a first communication device, and a second communication device;
    - receiving a history profile, including information indicative of a plurality of relationships, over time, between the first communication device and the second communication device;
    - predicting, based at least in part on the history profile, an expected relationship status between the first communication device and the second communication device during a specified time window;
    - receiving, during the specified time window, information indicative of a current relationship status between the first communication device and the second communication device;
    - determining that the current relationship status is not in accordance with the expected relationship status during the specified time window;
    - in response to determining that current relationship status is not in accordance with the expected relationship status during the specified time window, initiating a first alarm sequence.

14. The computer system of claim 13, wherein the first alarm sequence comprises program instructions to perform:
- sending a first alarm signal to the second communication device;
- listening for a response signal, responsive to the first alarm signal, that arrives within a predetermined time threshold; and
- in response to not receiving the response signal within the predetermined time threshold, sending a second alarm signal to a third communication device.

15. The computer system product of claim 13, wherein predicting the expected relationship status between the first communication device and the second communication device during the specified time window further comprises program instructions:
- identifying a relationship, of the plurality of relationships, that repeats, over time, on a predictable basis, to generate a predicted relationship dataset; and
- storing the predicted relationship dataset.

16. The computer system product of claim 13, wherein a history profile of a communication device comprises a plurality of vectors where each vector of the plurality of vectors includes information indicative of a plurality of properties of the communication device, where each property of the plurality of properties is selected from the group consisting of: a geographic position; a velocity; a time; a duration; a rate of travel; a direction of travel; and establishment of a link with a communication network.

17. The computer system product of claim 13, wherein a current status of a communication device comprises a vector where the vector includes information indicative of a plurality of properties of the communication device, where each property of the plurality of properties is selected from the group consisting of: a geographic position; a velocity; a time; a duration; a rate of travel; a direction of travel; and establishment of a link with a communication network.

18. The computer system product of claim 17, wherein a relationship status between the first communication device and the second communication device comprises information indicative of a vector of the first communication device at a given time, relative to a vector of the second communication device at the given time.

* * * * *